(12) United States Patent
Horie et al.

(10) Patent No.: US 6,387,003 B2
(45) Date of Patent: May 14, 2002

(54) CHAIN WITH IMPROVED ROCKER PIN JOINT STRUCTURE

(75) Inventors: Hiroshi Horie; Kazumasa Matsuno; Shigekazu Fukuda; Takayuki Funamoto; Yoshinori Iwasaki, all of Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/739,599

(22) Filed: Dec. 18, 2000

(30) Foreign Application Priority Data

Dec. 16, 1999 (JP) .............................. 11-357547

(51) Int. Cl.⁷ .......................... F16G 13/04; F16G 13/06
(52) U.S. Cl. ..................... 474/215; 474/212; 474/214
(58) Field of Search ............................... 474/213, 212, 474/214, 215, 216, 229, 117, 206; 59/4, 5, 78

(56) References Cited

U.S. PATENT DOCUMENTS

| | | | | |
|---|---|---|---|---|
| 3,742,776 A | * | 7/1973 | Avramidis | 474/215 |
| 4,904,231 A | * | 2/1990 | Zimmer | 474/214 |
| 5,236,399 A | * | 8/1993 | Sugimoto et al. | 474/215 |
| 5,242,333 A | * | 9/1993 | Sugimoto et al. | 474/212 |
| 5,651,746 A | * | 7/1997 | Okuda | 474/215 |
| 6,260,345 B1 | * | 7/2001 | Kanehira et al. | 474/215 |
| 6,277,046 B1 | * | 8/2001 | Ohara et al. | 474/215 |

* cited by examiner

Primary Examiner—David A. Bucci
Assistant Examiner—Marcus Charles
(74) Attorney, Agent, or Firm—Howson & Howson

(57) ABSTRACT

A chain includes a pair of rocker joint pins inserted through laterally aligned pin holes of two adjacent link plates. The pin holes have a pair of upper and lower pin-position constraining surfaces arranged to face upper and lower flat surfaces, respectively, of each rocker joint pin with a very small clearance defined therebetween so that the rocker joint pin is always kept in position against displacement in a vertical direction relative to the link plates. When the chain is urged to warp or bend into a V shape, each of the rocker joint pins is gripped by the upper pin-position constraining surface of one of the two adjacent link plates and a warp blocking surface of the other of the two adjacent link plate. Thus, such warping of the chain does not take place.

6 Claims, 4 Drawing Sheets

CHAIN WITH IMPROVED ROCKER PIN JOINT STRUCTURE

BACKGROUND OF THE INVENTION

The present invention relates generally to a chain having a number of interleaved rows of link plates articulately connected together in an endless fashion by means of rocker joint pins, and more particularly to a chain having an improved rocker pin joint structure.

A chain having a number of interleaved rows of link plates articulately connected together in an endless fashion by means of rocker joint pins is used as a silent chain or a CVT (Continuously Variable Transmission) chain. The silent chain is used as a driving chain for an engine camshaft, or a power-transmitting chain for a transmission. The CVT chain is used as a power-transmitting chain for a CVT unit.

These chains essentially comprise a plurality of interleaved rows of link plates connected together in an endless fashion by rocker joints each composed of a pair of rocker joint pins of different lengths. The link plates each have a pair of pin holes. A longer pin and a shorter pin jointly forming one rocker joint are inserted through the respective pin holes in the link plate of one row and the respective pin holes in the link plate of an adjacent row so as to join the two adjacent link plate rows.

The pin holes of the conventional chain have a generally circular shape. The inner peripheral surface of the generally circular pin hole includes a chord-like seat surface located closer to an outer end of the link plate than to the center of the link plate. The longer pin and the shorter pin have the same cross-sectional shape and each include a convexly arcuate rolling surface. These pins are inserted through laterally aligned pin holes of the overlapping link plates in such a manner that the respective rolling surfaces of the longer and shorter pins are in confrontation with each other with the longer pin being seated on the seat surface of the pin hole in one link plate, and the shorter pin being seated on the seat surface of the pin hole in an adjacent link plate.

The chain of the foregoing construction, when used as a silent chain for an automobile, is required to have high wear resistance, great noise reduction and good lubricating properties in addition to easy assembly and producibility, and low cost.

In order to improve wear resistance, an attempt has been made to provide a large space for holding a lubricating oil between upper and lower portions of the outer peripheral surface of each pin and corresponding upper and lower portions of the inner peripheral surface of the pin hole. This prior attempt has not been satisfactory because the rocker joint pins are liable to displacement within the pin holes when they are designed to have a relatively small thickness for enabling adjustment of the chain pitch during assembly, or when they becomes thin due to progressive wear.

Once the rocker joint pins are displaced from the correct position within the pin holes, it becomes no longer possible for the respective rolling surfaces to contact with each other on a pitch line of the chain. Even though a large lubricating oil holding space is provided for improving wear resistance, wear has occurred with rocker joint pins and link plates due to interference between the displaced rocker joint pins and the inner peripheral surfaces of the pin holes.

In addition, since the respective rolling surfaces of the longer and shorter pins contact each other at an incorrect position, wear on the rolling surfaces is locally intensified, causing deterioration of the durability of the chain. The contact of the rolling surfaces at incorrect positions gives rise to the additional problem that the link plates are displaced or offset from the pitch line and hence unable to start meshing with a sprocket at a correct position. This will result in a remarkable increase in operation noise.

Japanese Utility Model Laid-open Publication No. 62-196950 and Japanese Patent No. 2924915 disclose a chain wherein a projection is provided at an upper portion or a lower portion of the inner peripheral surface of each pin hole so as to prevent displacement including rotation of rocker joint pins within the pin hole and also to prevent adjacent link plates from becoming bent into a V shape. By the projection thus provided, the rocker joint pins are held in position against displacement relative to the link plates.

However, the projection gives rise to another problem. The effective contact area between respective rolling surfaces of the longer and shorter pins is reduced by the projection, and the wear resistance of the chain deteriorates with a reduction of the effective contact area. In addition, since the projection partly surrounds the contour of each rocker joint pin, a space for holding a lubricating oil, defined between the opposed rolling surfaces, is reduced. This may accelerate wear of the rolling surfaces due to insufficient lubrication. Furthermore, due to the presence of the projection, placement of the rocker joint pins into the pin holes is not easy to achieve, thereby lowering the assembly efficiency and increasing the assembly cost. In addition, the presence of the projection makes it difficult to produce the link plates by punching due to a shortened service life of punching dies. This may add to the cost of the chain.

SUMMARY OF THE INVENTION

It is accordingly an object of the present invention to provide a chain having an improved rocker pin joint structure which is capable of holding rocker joint pins in a correct position against displacement relative to link plates.

Another object of the present invention is to provide a rocker pin joint structure of a chain, having a combination of a unique profile of the pin holes and a unique cross-sectional shape of the rocker joint pins, which is capable of preventing warping or reverse bend of the chain.

A further object of the present invention is to provide a chain having an improved rocker pin joint structure capable of withstanding a great load.

According to the present invention, there is provided a chain comprising a plurality of interleaved rows of link plates articulately connected together in an endless fashion by means of rocker pin joints. Each of the link plates has a pair of pin holes. Each of the rocker pin joints is composed of a pair of rocker joint pins inserted through each of the pair of pin holes in one link plate and each of the pair of pin holes in an adjacent link plate. The pair of rocker joint pins has a convexly arcuate rolling surface, a back surface opposite to the rolling surface, and a pair of upper and lower flat surfaces formed between the rolling surface and the back surface and extending in a longitudinal direction of the chain. Each of the pin holes has a seat surface engaged with the back surface and formed on a side located closer to an outer end of each link plate than to a center of the link plate, a pair of upper and lower pin-position constraining surfaces facing the upper and lower flat surfaces, respectively, of one of the pair of rocker joint pins seated on the seat surface with a very small clearance defined between each of the flat surfaces and a corresponding one of the pin-position constraining surfaces, a bend permitting surface contiguous to the upper pin-position constraining surface and spaced from the upper flat surface of the other rocker joint pin seated on the seat surface of the pin hole in the adjacent link plate, a warp blocking surface contiguous to the lower pin-position constraining surface and facing the lower flat surface of the other rocker joint pin seated on the seat surface of the pin hole in the adjacent link plate with a very small clearance defined therebetween, and a concavely arcuate surface contiguous to the bend permitting surface and the warp blocking surface and spaced from the back surface of the other rocker joint pin seated on the seat surface of the pin hole in the adjacent link plate.

When the chain is stretched substantially straight, the rocker joint pins are in contact with each other at their rolling surfaces within the pin holes of the two adjacent link plates.

Assuming that the one rocker joint pin is a longer pin and the other rocker joint pin is a shorter pin, the back surface of the longer pin is seated on the seat surface of a first link plate of the two adjacent link plates, and the back surface of the shorter pin is seated on the seat surface of a second link plate of the two adjacent link plates. The upper and lower flat surfaces of the longer pin face the upper and lower pin-position constraining surfaces, respectively, of the first link plate with a very small clearance being defined between each of the flat surfaces and a corresponding one of the pin-position constraining surfaces, so that the longer pin is prevented from moving in a vertical direction relative to the first link plate. The upper and lower flat surfaces of the shorter pin face the upper and lower pin-position constraining surfaces, respectively, of the second link plate with a very small clearance being defined between each of the flat surfaces and a corresponding one of the pin-position constraining surfaces, so that the shorter pin is prevented from moving in a vertical direction relative to the second link plate. Accordingly, when the chain in stretched substantially straight, both the longer pin and the shorter pin are held in position against vertical displacement relative to the first and second link plates. The respective rolling surfaces of the longer and shorter pins are, therefore, able to contact with each other at a correct position, so that they are free from local wear. In addition, the chain, while in a stretched condition, does not cause whipping or waving, thus reducing noises produced when the chain comes into meshing engagement with the sprocket.

The very small clearance provided between the upper flat surface of each rocker joint pin and the upper pin-position constraining surface of each link plate is indispensable for enabling placement of the rocker joint pins into the pin holes to thereby articulately join two adjacent link plates. The clearance is determined in view of manufacturing tolerances of the link plates and the rocker joint pins and should preferably be as small as possible.

When the chain is about to travel around the sprocket, the first link plate, for example, comes into meshing engagement with the sprocket before the second link plate. This movement causes the first link plate to turn or pivot about a common center of the pin holes of the first and second link plates. In this instance, the longer pin, seated on the seat surface of the first link plate, rolls on the rolling surface of the shorter pin which is seated on the seat surface of the second link plate. The upper pin-position constraining surface of the first link plate and the upper flat surface of the longer pin angularly move in phase with each other. During that time, the angular movement of the upper flat surface of the longer pin caused due to pivotal movement of the first link is permitted or accommodated by the bend permitting surface of the second link plate because the bend permitting surface is spaced from the upper flat surface of the longer pin when the chain is stretched substantially straight.

In addition, since the back surface of the longer pin is spaced or separated from the concavely arcuate surface of the second link plate, angular movement of the back surface, occurring when the first link plate is caused to turn relative to the second link plate, is permitted.

The chain as it is in the stretched straight state is sometimes forced to warp or bend about a rocker pin joint into a V shape. Such warping of the chain is prevented from occurring by means of the warp blocking surface of the present invention. For instance, when the first link plate is urged to turn or pivot in the reverse direction about the common center of the pin holes of the first and second link plates, the longer pin is gripped between the upper pin-position constraining surface of the first link plate and the warp blocking surface of the second link plate because the upper and second flat surfaces of the longer pin face the upper pin-position constraining surface of the first link plate and the warp blocking surface of the second link plate, respectively. At the same time, the short pin is gripped between the upper pin-position constraining surface of the second link plate and the warp blocking surface of the first link plate because the upper and second flat surfaces of the shorter pin face the upper pin-position constraining surface of the second link plate and the warp blocking surface of the first link plate, respectively.

In one preferred form of the present invention, the upper and lower pin-position constraining surfaces of each of the pin holes are formed on one side of a vertical centerline of the pin hole which is located closer to the outer end of each link plate than to the center of the link plate, and the bend permitting surface and the warp blocking surface are formed on the other side of the vertical centerline, which is located closer to the center of the link plate than to the outer end of the link plate.

It is preferable that the upper and lower flat surfaces of each rocker joint pin are straight and parallel with each other, and the upper and lower pin-position constraining surfaces of each pin hole are straight and parallel with each other. The warp blocking surface may be straight and symmetrical with the straight lower pin-position constraining surface about the vertical centerline of the pin hole. The upper and lower pin-position constraining surfaces may be sloping down toward the outer end of the link plate. Further, the bend permitting surface may be straight and extend at an angle to the upper pin-position constraining surface in such a manner that the bend permitting surface gradually retreats from the upper pin-position constraining surface in a radial outward direction of the pin hole.

BRIEF DESCRIPTION OF THE DRAWINGS

A preferred embodiment of the present invention will now be described in detail, by way of example only, with reference to the accompanying drawings, in which.

DETAILED DESCRIPTION OF THE PREFERRED EMBODIMENT

The following description is merely exemplary in nature and is in no way intended to limit the invention or its application or uses.

Figure 1:
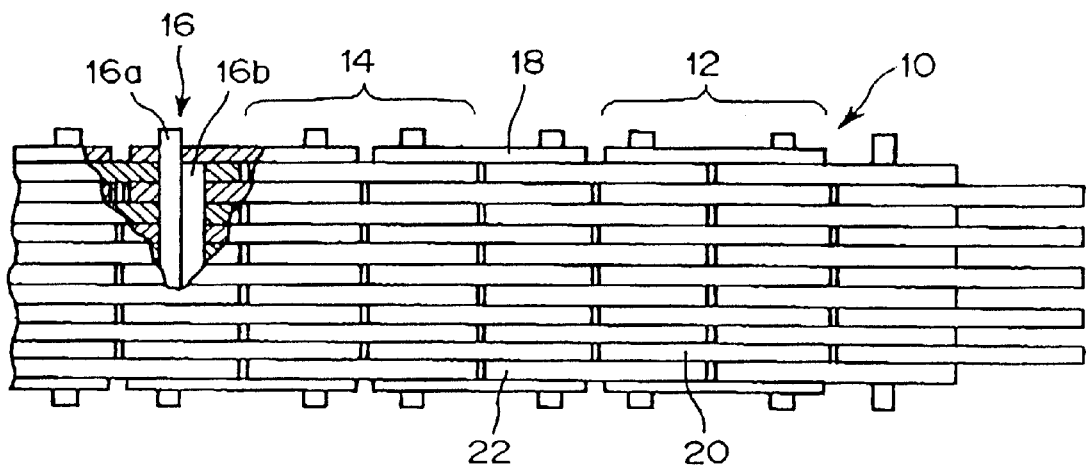
FIG. 1 is a fragmentary plan view, partly in cross section, of a silent chain having rocker joint pins according to an embodiment of the present invention.
Figure 2:
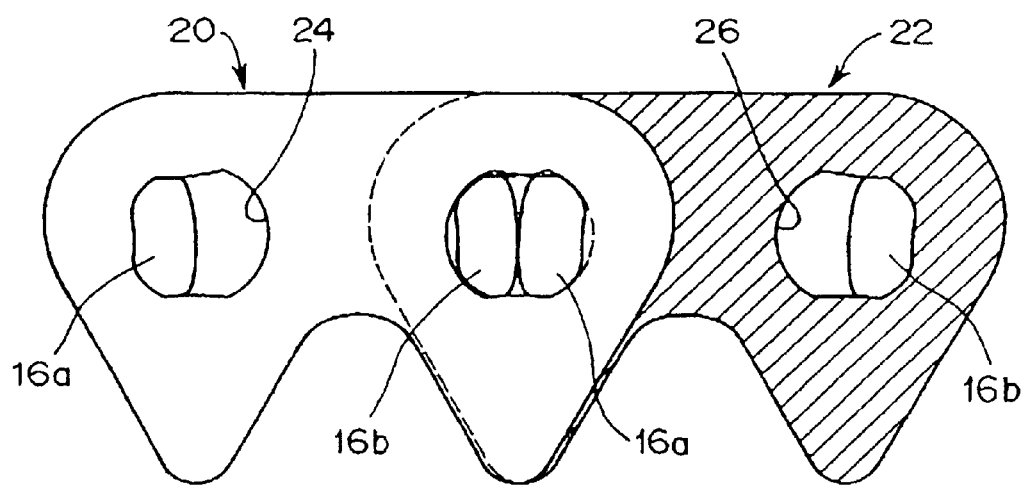
FIG. 2 is a front elevational view showing the relationship between two adjacent link plates of the silent chain articulately connected together by a rocker pin joint composed of a pair of rocker joint pins.

Referring now to the drawings and FIGS. 1 and 2 in particular, there is shown a silent chain 10 having a rocker pin joint structure according to the present invention. The rocker pin joint structure is also useful when embodied in a CVT chain (not shown).

The silent chain 10 includes guide link rows 12 and intermediate link rows 14 arranged alternately in the longitudinal direction of the chain 10. The guide link rows 12 and the intermediate link rows 14 are articulately connected in an endless fashion by means of rocker pin joints 16. The guide link rows 12 each have a pair of guide plates 18 and at least one link plate 20. The intermediate link rows 14 each have link plates 22 numbering one more than the number of the link plates 20 in each of the guide link rows 12. The link plates 20 of the guide link rows 12 are interleaved with the link plates 22 of the intermediate link rows 14. In the illustrated embodiment, the guide link rows 12 each have five link plates 20, and the intermediate link rows 14 each have six link plates 22.

The link plates 20 of the guide link rows 12 and the link plates 22 of the intermediate link rows 14 are identical in shape and configuration. The thickness of the link plates 20 may be different from the thickness of the link plates 22.

The rocker pin joints 16 are each composed of a pair of pins 16a, 16b of different lengths. The longer pin 16a is inserted transversely through the link plates 20 in each guide link row 12 and the link plates 22 in the adjacent intermediate link row 14. The longer pin 16a has opposite end portions firmly fitted with the pair of guide plates 18 in the same guide link row 12. The shorter pin 16b is inserted transversely through the link plates 20 in the guide link row 12 and the link plates 22 in the adjacent intermediate link row 14. The longer pin 16a and the shorter pin 16b have the same cross-sectional shape and they extend substantially straight in the widthwise or transverse direction of the chain.

Figure 3:
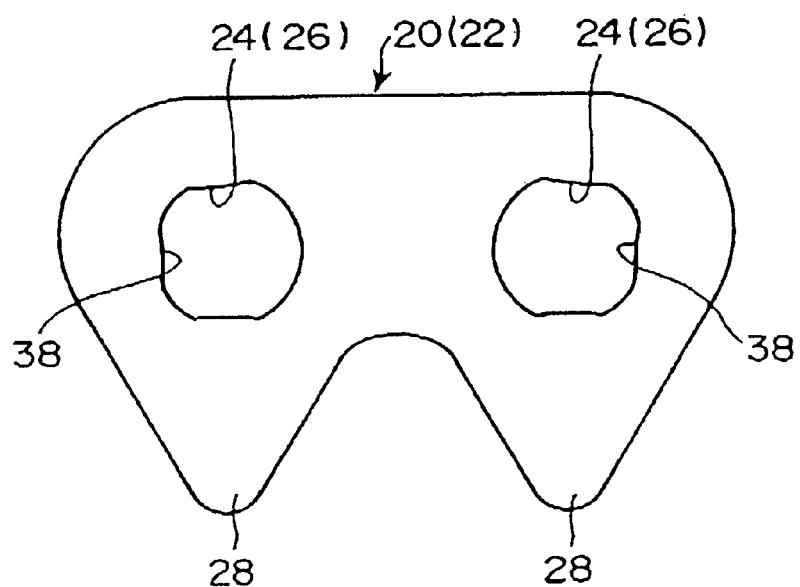
FIG. 3 is a front elevational view of the link plate.

As shown in FIG. 3, each of the link plates 20 (22) has a pair of pin holes 24, 24 (26, 26) formed therethrough in symmetrical relationship with respect to a center of the link plate 20 (22), and a pair of teeth 28, 28 formed on one side of the link plate 20 (22) for meshing engagement with teeth on a sprocket (not shown).

Figure 4:
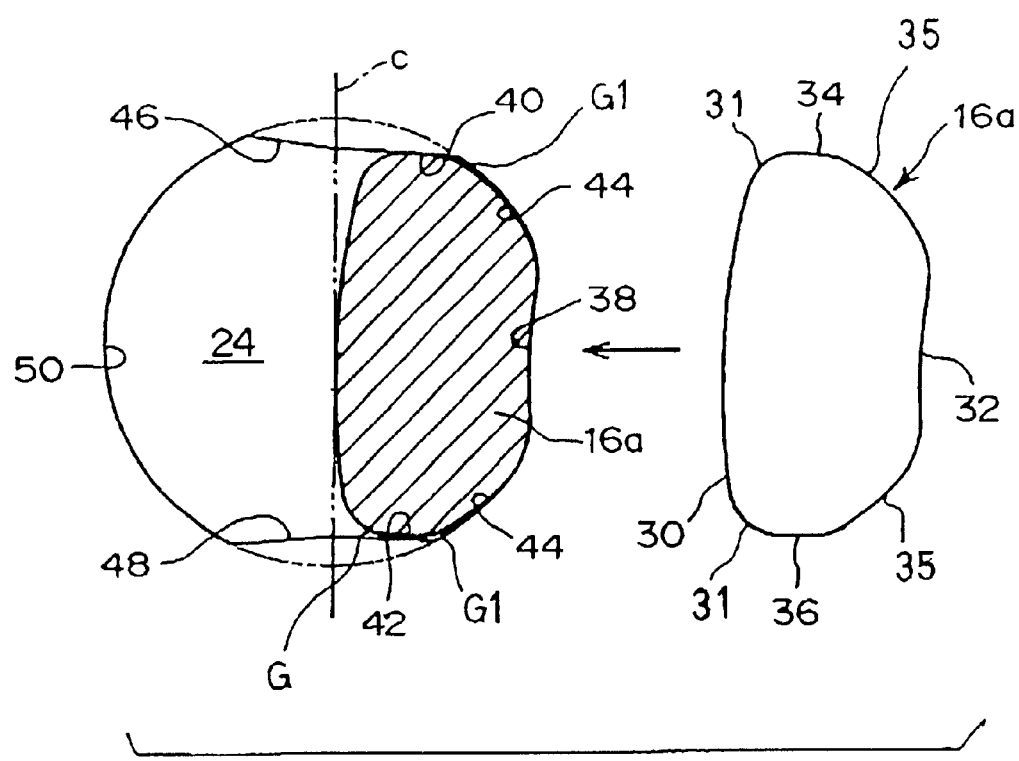
FIG. 4 is a view illustrative of the manner in which a rocker joint pin is inserted through one pin hole in the link plate.

FIG. 4 shows, in front elevation, the positional relationship between the pin hole 24 in the link plate 20 and the longer pin 16a. The positional relationship between the pin hole 26 in the link plate 22 and the shorter pin 16b is the same as the relationship shown in FIG. 4, and no further description thereof is needed.

The outer peripheral surface of each rocker pin joint 16 (the longer pin 16a being shown in FIG. 4) includes a convexly arcuate rolling surface 30, a concavely arcuate back surface 32 opposite to the rolling surface, and a pair of upper and lower flat surfaces 34, 36 formed between the rolling surface 30 and the back surface 32 and extending in the longitudinal direction of the chain. Circumferentially opposite ends of the convexly arcuate rolling surface 30 and the flat surfaces 34, 36 are connected together by a pair of rounded or arcuate surfaces 31 of a relatively small radius of curvature. Circumferentially opposite ends of the concavely arcuate back surface 32 and the flat surfaces 34, 36 are connected together by a pair of convexly arcuate surfaces 35. The upper and lower flat surfaces 34 and 36 are parallel with each other.

Referring back to FIG. 3, the pin holes 24 formed in the link plate 20 each have an inner peripheral surface including a convexly arcuate seat surface 38. The seat surface 38 is complemental in contour to the concavely arcuate back surface 32 of the longer pin 16a so that when the chain 10 (FIG. 1) is stretched substantially straight, the seat surface 38 is in close fit with the back surface 32 of the longer pin 16a without forming a clearance therebetween.

As detailed in FIG. 4, the inner peripheral surface of the pin hole 24 further has a pair of upper and lower pin-position constraining surfaces 40, 42. When the longer pin 16a is seated on the seat surface 38 of the pin hole 24, the upper and lower pin-position constraining surfaces 40, 42 of the pin hole 24 face the upper and lower flat surfaces 34, 36, respectively, of the longer pin 16a. The pin-position constraining surfaces 40, 42 have a rectilinear profile when viewed from the direction of the axis of the pin hole 24. These surfaces 40, 42 are formed on one side of a vertical centerline c of the pin hole 24 which is located closer to an outer end of the link plate 20 (FIG. 1) than to the center of the link plate 20. In the illustrated embodiment, the pin-position constraining surfaces 40, 42 are sloping down toward the outer end of the link plate 20. The pin-position constraining surfaces 40, 42 are engageable with the flat surfaces 34, 36 of the longer pin 16a to prevent movement of the longer pin 16a in a vertical direction. The pin-position constraining surfaces 40, 42 are parallel to the flat surfaces 34, 36 of the longer pin 16a. Since the flat surfaces 34, 36 are parallel with each other, the pin-position constraining surfaces 40, 42 are also parallel with each other. The distance between the upper and lower flat surfaces 34, 36 is slightly greater than the distance between the upper and lower pin-position constraining surfaces 40, 42 so that a very small gap or clearance G is defined between each of the flat surfaces 34, 36 and a corresponding one of the pin-position constraining surfaces 40, 42. The clearance G is indispensable because it is necessary for enabling placement or insertion of the rocker joint pins 16a and 16b through the link plates 20, 22 during the assembly of the chain. The clearance G is determined in view of manufacturing tolerances of the link plates 20, 22 and pins 16a, 16b and should preferably be as small as possible.

By the pin-position constraining surfaces 40, 42 thus provided, the longer pin 16 is held in position against vertical displacement relative to the link plate 20. However, since the flat surfaces 34, 36 and the pin-position constraining surfaces 40, 42 are parallel with each other, the longer pin 16a is allowed to move in the longitudinal direction of the chain 10 relative to the link plate 20. Even when the longer pin 16a is displaced in the longitudinal direction of the chain 10 relative to the link plate 20, the longer pin 16a is kept immovable in the vertical direction by way of abutting engagement between the flat surfaces 34, 36 and the mating pin-positioning surfaces 40, 42.

The seat surface 38 and each of the pin-position constraining surfaces 40, 42 are connected by a concavely arcuate surface 44. The arcuate surface 44 is substantially complemental in contour to the convexly arcuate surfaces 35 of the longer pin 16a. When the back surface 32 of the longer pin 16a is seated on the seat surface 38 of the pin hole 24, each of the arcuate surface 35, 35 and a mating one of the arcuate surfaces 44 define therebetween a slight clearance or gap G1.

The inner peripheral surface of the pin hole 24 further includes a straight, bend permitting surface 46 contiguous to the upper pin-position constraining surface 40, and a straight, warp blocking surface 48 contiguous to the lower pin-position constraining surface 42. The bend permitting surface 46 and the warp blocking surface 48 are formed on the other side of the vertical centerline c which is located closer to the center of the link plate 20 than to the outer end of the link plate 20. The bend permitting surface 46 and the warp blocking surface 48 are connected together by a concavely arcuate surface 50. The bend permitting surface 46 extends at an angle to the upper pin-position constraining surface 40 in such a manner as to retreat gradually from the pin-position constraining surface 40 in a radial outward direction of the pin hole 24. The warp blocking surface 48 and the lower pin-position constraining surface 42 are symmetrical with each other about the vertical centerline c of the pin hole 24.

Thus, the inner peripheral surface of the pin hole 24 as a whole is formed jointly by the seat surface 38, pin-position constraining surfaces 40, 42, arcuate surfaces 44, 44, bend permitting surface 46, warp blocking surface 48 and arcuate surface 50.

Figure 5:
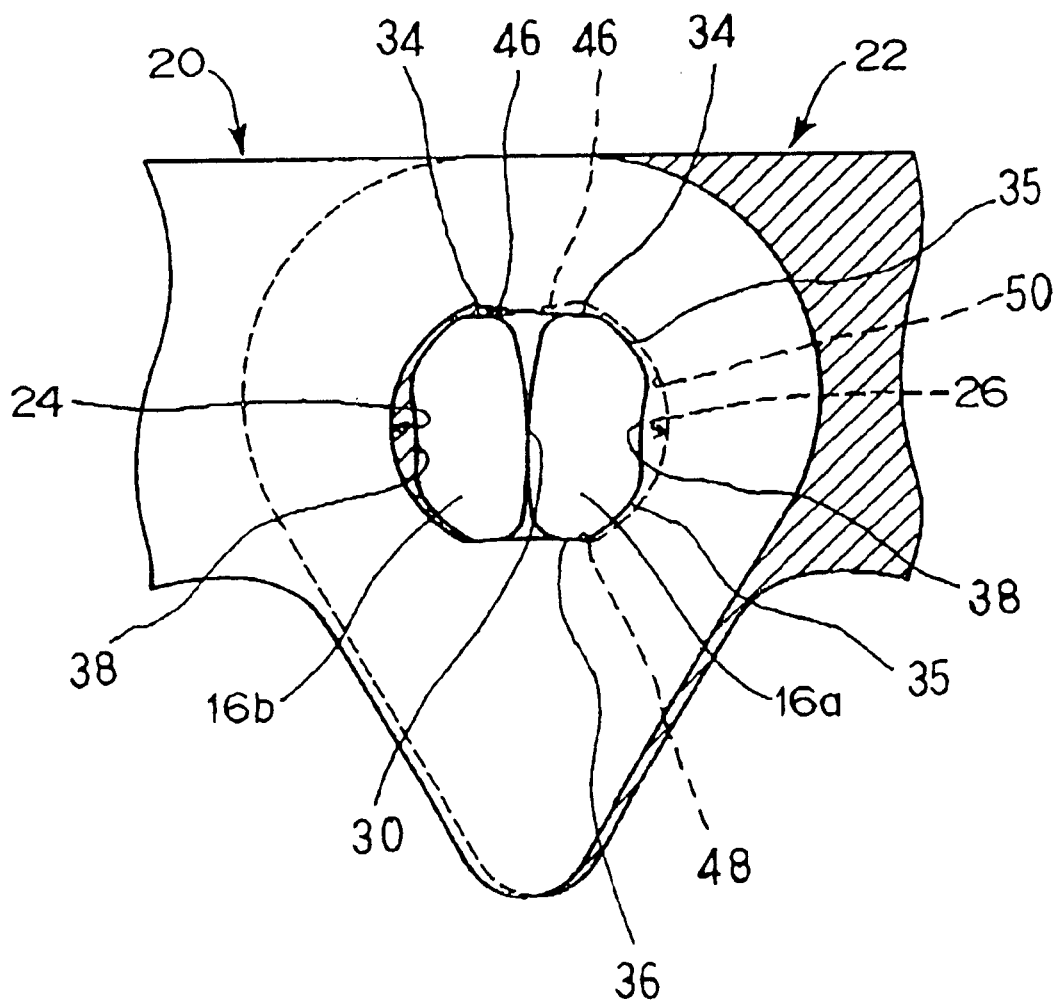
FIG. 5 is a front elevational view showing the relationship between the pair of rocker joint pins and laterally aligned pin holes in the two adjacent link plates.

FIG. 5 shows two adjacent link plates 20 and 22 connected together by a pair of rocker joint pins 16a and 16b inserted through respective pin holes 26, 26 of the link plates 20, 22. For purposes of illustration, the link plate 22 is indicated by hatching. The relationship between the pin hole 24 in the link plate 20 and the longer pin 16a and the relationship between the pin hole 26 in the link plate 22 and the shorter pin 16b are the same as those previously described with reference to FIG. 4.

When the chain 10 (FIG. 1) is stretched substantially straight, the longer pin 16a and the shorter pin 16b are seated on the seat surface 38 of the pin hole 24 of the link plate 20 and the seat surface 38 of the pin hole 26 of the link plate 22, respectively, with their rolling surfaces 30 being in contact with each other. In this condition, the upper flat surface 34 of the longer pin 16a is separated from the bend permitting surface 46 of the pin hole 26 of the link plate 22. On the other hand, the lower flat surface 36 of the longer pin 16a is parallel spaced from the warp blocking surface 48 of the pin hole 26 of the link plate 22 by the very small gap or clearance G (see FIG. 4) defined therebetween. The arcuate surfaces 35 of the longer pin 16a are separated from the arcuate surface 50 of the pin hole 26 of the link plate 22.

Figure 6A:
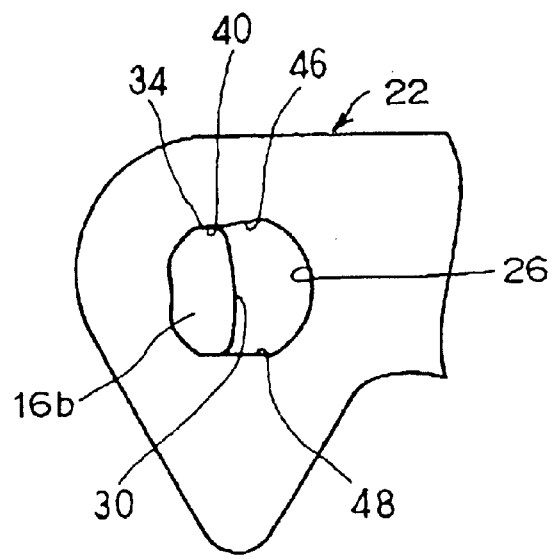
FIGS. 6A–6C are views illustrative of the manner in which a first link plate is caused to turn or pivot about a common axis relative to a second link plate when the chain starts to mesh with the sprocket.
Figure 6B:
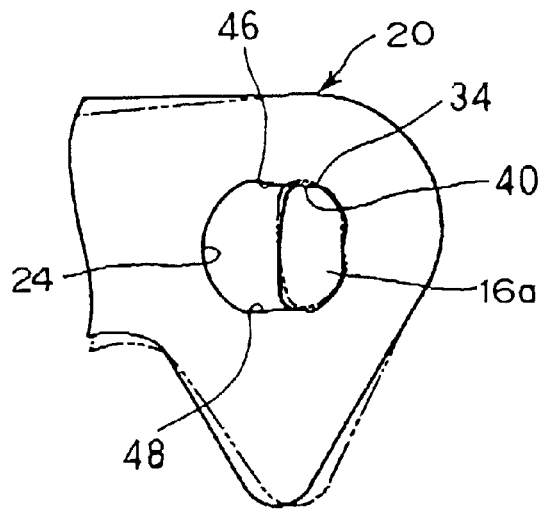
Figure 6C:
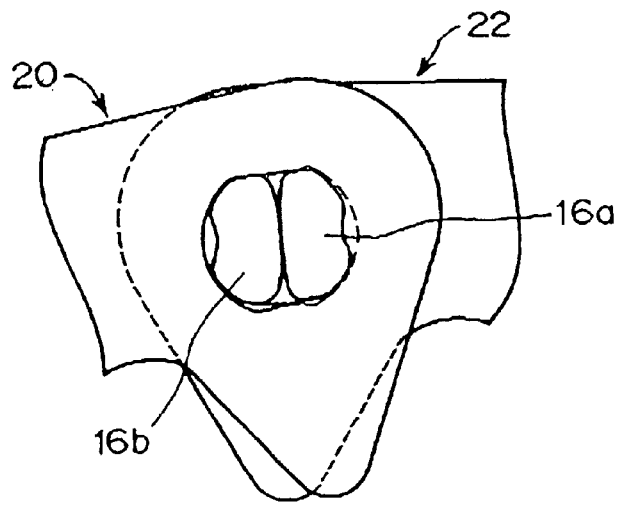

FIGS. 6A–6C illustrate the operation of the rocker pin joint structure of the present invention achieved when the silent chain 10 (FIG. 1) is bent. For purposes of clarity, FIG. 6A shows the relation between the pin hole 26 of one link plate 22 and the shorter pin 16b, and FIG. 6B shows the relation between the in hole 24 of an adjacent link plate 20 and the longer pin 16a. FIG. 6C shows the relation of FIG. 6A and the relation of FIG. 6B in combination. In FIGS. 6A–6B, the link plate 20 is precedent to the link plate 22 when viewed from the direction of travel of the chain.

When the chain is about to travel around a sprocket (not shown), the link plate 20 begins to turn or pivot counterclockwise about the common center or axis of the pin holes 24, 26 relative to the link plate 22. With this pivotal movement of the link plate 20, the longer pin 16a rolls on the rolling surface 30 of the shorter pin 16b until it assumes the position indicated by the phantom line shown in FIG. 6B. During that time, the upper flat surface 34 of the longer pin 16a does not interfere with the bend permitting surface 46 of the pin hole 26 of the link plate 22, and the upper flat surface 34 of the shorter pin 16b does not interfere with the bend permitting surface 46 of the pin hole 24 of the link plate 20.

When the link plates 20 and 22 are caused to warp or bent into a V shape (or when the link plate 20 is caused to turn or pivot clockwise about the rocker joint pins 16a, 16b), the upper flat surface 34 of the longer pin 16a is gripped between the upper pin-position constraining surface 40 of the pin hole 24 in the link plate 20 and the warp blocking surface 48 of the pin hole 26 of the link plate 22. Similarly, the upper flat surface 34 of the shorter pin 16b is gripped between the upper pin-position constraining surface 40 of the pin hole 26 in the link plate 22 and the warp blocking surface 48 of the pin hole 24 of the link plate 20. The relative pivotal movement of the link plates 20 and 22 in the reverse direction to assume a V shape can thus be prevented. It is to be noted, however, that due to the presence of the small clearance G (FIG. 4) between each of the flat surfaces 34, 36 of each rocker joint pin 16a, 16b and a corresponding one of the pin-position constraining surfaces 40, 42 of each link plate 20 or 22, the link plates 20, 22 are permitted to turn or pivot slightly relative to each other until the clearance G becomes zero or disappears.

Thus, the rocker joint pins 16a, 16b are held in an appropriate position relative to the link plates 20, 22 without causing vertical displacement relative to the link plates. Thus, wobbling of the rocker joint pins 16a, 16b can be reduced with the result that wear of the link plates 20, 22 and the rocker joint pins 16a, 16b is suppressed. In addition, since the vertical displacement of the rocker joint pins is prevented, the respective rolling surfaces 30, 30 of the longer and shorter pins 16a, 16b can always contact each other at a correct position. The rolling surfaces 30 are therefore substantially free from local wear.

As described above, when the chain of the present invention is in a stretched straight state, a longer pin and a shorter pin jointly forming a single rocker pin joint are constrained in position relative to two adjacent link plates. The respective rolling surfaces of the longer and shorter pins are, therefore, able to contact with each other at a correct position. As a result, wobbling of the rocker joint pins is considerably reduced, and the rocker joint pins do not slide on the inner peripheral surface of the pin hole of each link plate. The rocker joint pins and the link plates are thus protected against abrasive wear, and the rolling surfaces of the rocker joint pins are free from local wear.

When the chain is forced to warp or bend into a V shape, each rocker joint pin is gripped between an upper pin-position constraining surface of a first link plate of the two adjacent link plates a warp block surface of a second link plate of the two adjacent link plates. Thus, warping of the chain does not take place.

The pin hole of the present invention, as against the pin hole of the prior art, is free of a projection. Accordingly, by merely placing the rocker joint pins into the pin holes of the link plates, the chain of the present invention can be assembled with high efficiency comparable to the efficiency attained when a conventional chain with round connector pins. Owing to the absence of the projection, the link plates can be easily produced at a relatively low cost, and a die assembly used for producing the link plates has a relatively long service life.

Furthermore, due to the absence of the projection, the rocker joint pins are allowed to have a rolling surface with a relatively large effective contact area. The rolling surface has a relatively large radius of curvature which is effective to lower the contact pressure. This arrangement improves the wear resistance of the rocker joint pins. In addition, due to the absence of the projection, the pin hole and the rocker joint pins received therein jointly form a relatively large space for holding therein a lubricating oil which is enough to lubricate the rolling surfaces of the rocker joint pins. The wear resistance of the rocker joint pins and the link plates is further improved.

Obviously, various minor changes and modifications of the present invention are possible in the light of the above teaching. It is therefore to be understood that within the scope of the appended claims, the present invention may be practiced otherwise than as specifically described.

What is claimed is:

1. A chain comprising:

a plurality of interleaved rows of link plates articulately connected together in an endless fashion by means of rocker pin joints, each of said link plates having a pair of pin holes, each of said rocker pin joints being composed of a pair of rocker joint pins inserted through each of said pair of pin holes in one link plate and each of said pair of pin holes in an adjacent link plate;

said pair of rocker joint pins having a convexly arcuate rolling surface, a back surface opposite to said rolling surface, and a pair of upper and lower flat surfaces formed between said rolling surface and said back surface and extending in a longitudinal direction of the chain; and each of said pin holes having a seat surface engaged with said back surface and formed on a side located closer to an outer end of each link plate than to a center of the link plate, and a pair of upper and lower pin-position constraining surfaces facing said upper and lower flat surfaces, respectively, of one of said pair of rocker joint pins seated on said seat surface with a very small clearance defined between each of said flat surfaces and a corresponding one of said pin-position constraining surfaces, a bend permitting surface contiguous to said upper pin-position constraining surface and spaced from said upper flat surface of the other rocker joint pin seated on said seat surface of said pin hole in said adjacent link plate, a warp blocking surface contiguous to said lower pin-position constraining surface and facing said lower flat surface of said other rocker joint pin seated on said seat surface of said pin hole in said adjacent link plate with a very small clearance defined therebetween, and a concavely arcuate surface contiguous to said bend permitting surface and said warp blocking surface and spaced from said back surface of said other rocker joint pin seated on said seat surface of said pin hole in said adjacent link plate.

2. The chain according to claim 1, wherein said upper and lower pin-position constraining surfaces of each of said pin holes are formed on one side of a vertical centerline of said each pin hole which is located closer to said outer end of each link plate than to the center of the link plate, and said bend permitting surface and said warp blocking surface are formed on an other side of the vertical centerline which is located closer to the center of the link plate than to the outer end of the link plate.

3. The chain according to claim 2, wherein said upper and lower flat surfaces of each said rocker joint pin are straight and parallel with each other, and said upper and lower pin-position constraining surfaces of each said pin hole are straight and parallel with each other.

4. The chain according to claim 3, wherein said warp blocking surface is straight and symmetrical with said straight lower pin-position constraining surface about said vertical centerline of said pin hole.

5. The chain according to claim 4, wherein said upper and lower pin-position constraining surfaces are sloping down toward said outer end of the link plate.

6. The chain according to claim 5, wherein said bend permitting surface is straight and extends at an angle to said upper pin-position constraining surface such that the bend permitting surface gradually retreats from said upper pin-position constraining surface in a radial outward direction of the pin hole.

* * * * *